United States Patent Office 3,540,860
Patented Nov. 17, 1970

3,540,860
ACID REGENERATION
Linden Wayne Cochran, Basking Ridge, N.J., assignor to Multi-Minerals Limited, Toronto, Ontario, Canada, a corporation of Canada
No Drawing. Filed Sept. 13, 1967, Ser. No. 667,367
Int. Cl. C02b 1/46
U.S. Cl. 23—338
44 Claims

ABSTRACT OF THE DISCLOSURE

An acidic solution obtained from leaching or descaling operations is regenerated by treating the solution with a strong acid ion exchange resin while at least part of the cations in the solution are in the reduced state. The ion exchange resin is regenerated by elution with a sulfurous acid-carbonyl solution. Economical advantages in the utilization of resin regenerant are enjoyed by sequential stripping-distilling operations on the eluate and thermal decomposition of precipitate therefrom to recover and recycle $SO_2$. Dissolved rare earth element salts present in the treated acid, may be further recovered by heating or allowing to stand to hydrolyze and form a gel which is removable by precipitation and filtration.

BACKGROUND OF THE INVENTION

Strong acids are used as leaching or cleaning (descaling) agents in a variety of industrial processes. Regeneration of the spent acid by the removal of dissolved metallic ions presents difficulties. Varying procedures have been advocated for the problem and with varying degrees of success. Aluminum, for example, can be recovered from mixtures of chromic and phosphoric acid by means of ion exchange resins. Iron scale, removed from steel in pickling operations in which hydrochloric acid is utilized as the cleaning agent, can be removed by a recently developed process wherein the ferrous ion, as ferrous chloride, is reacted with water to form ferric oxide and hydrogen chloride.

In other processes, the presence of dissolved metallic salts leads to serious sedimentation problems. For example, in the "wet process" for manufacturing phosphoric acid, double salts of iron and aluminum precipitate as a heavy sludge and seriously complicate storage and transportation routines. Numerous solutions have been advocated for the control or prevention of such sedimentation, including the use of chelating or sequestering agents as illustrated by U.S. Pat. No. 3,118,730.

It has been suggested that the use of strong acid ion exchange resins offers an ideal method for the removal of cations from acidic solutions. The nature of such resins, their manufacture and the mechanism of their functioning has been described in technical journals and patent literature. Specific instances of the use of strong acid ion exchange resins to remove cations from acidic solutions can be found as follows: aluminum from concentrated phosphoric acid, "Bright Dip Breakthrough," Modern Metals, August 1963; "Treatment of Hexavalent Chromium Compounds" U.S. Pat. No. 2,733,204, "Plutonium Concentration and Decontamination Method" U.S. Pat. No. 2,863,718, "Cation Exchange Method for the Recovery of Protactinium" U.S. Pat. No. 2,894,807, "Method of Recovery of Uranium by a Resin-In-Pulp Process" U.S. Pat. No. 2,743,154, "Method of Purifying and Recovering Vanadium from Phosphate-Containing Solutions" U.S. Pat. No. 2,770,522. The use of strong acid ion exchange resins as well as the basic or anion form of ion exchange resins in rare earth recovery is described in a number of patents and reports, the most adequate compilation of which, it is believed, is found in the book "Progress in the Science and Technology of the Rare Earths" vol. I, Macmillan Company, 1964.

Therefore, a strong acid ion exchange resin has the ability to remove all, or substantially all, of the cations that would normally be found in an acidic medium, such as, for example, the ordinary "wet process" phosphoric acid of commerce. This product is the result of digesting apatite with sulfuric acid, precipitating and filtering the major part of the calcium as gypsum. The resulting acid is contaminated with residual calcium, $SO_4^{--}$ anion, and the dissolved salts of the various metallic elements found in the original apatite feed stock.

Ion exchange systems, however, possess certain inherent disadvantages which frequently render their utilization technically or economically unsuitable. One of the more vexatious technical problems is presented by dissolved iron in the +3 oxidation state. Ion exchange systems designed to remove ferric ion from acidic solutions have not been spectacularly successful. It is only with great difficulty that this cation, or as is frequently the case, the double salt of iron and another cation, can be absorbed on the active resin site. Once absorbed, ferric ion is equally difficult to elute, and if not properly removed, will eventually hydrolyze and deposit as $Fe_2O_3$ within or on the resin cage. Thus, where ferric iron is one of the cations to be removed from an acid solution the use of ion exchange resins is virtually precluded.

From an economic viewpoint ion exchange resins have definite limitations in applications for the removal of cations from acidic solutions. This is particularly the case where the unit value of the acid being reconditioned is low, the value of the cations being removed is negligible or where the cost of the regenerant is proportionately high, either per unit utilized or in total because of the excessive quantities required to effect regeneration.

OBJECTS OF THE INVENTION

Accordingly, it is an object of the present invention to provide a method for the regeneratiton of an acidic solution which is not attended by the foregoing disadvantages of the prior art.

Another object of the invention is to provide a method whereby acidic solutions which contain dissolved iron in the ferric state may be regenerated by treatment with strong acid ion exchange resins.

A further object of this invention is to provide an improved method for regenerating the ion exchange resin used to treat the acidic solution.

Yet another object of this invention is to provide a method for the regeneration of acidic solutions wherein certain valuable mineral elements that are normally lost may be recovered.

Other objects of the invention will in part be obvious and in part appear hereinafter in the following detailed description of the invention and the preferred embodiments thereof.

SUMMARY OF THE INVENTION

The present invention relates to the regeneration of an acidic solution for re-use in leaching or de-scaling operations. More particularly, the invention relates to the regeneration of an acidic solution by the use of a strong acid ion exchange resin on the hydrogen cycle to effect removal of contained cations. The invention also relates to the economical regeneration of such resins and to the recovery of rare earth values as a by-product of regenerating the acidic solution.

In general, the invention concerns a method for the regeneration of an acidic solution used in leaching mineral values from ores and the like or in cleaning and de-scaling metals such as iron and steel. The leaching or cleaning operations results in the accumulation of cations in the acidic solution. In accordance with the invention, the acidic solution, rich in cations, is withdrawn as an aliquot or in its entirety from the system. Thereafter, the solution is first treated to reduce troublesome ions, such as the ferric ion to its ferrous state, and contacted with a strong acid ion exchange resin under conditions such that troublesome ions are maintained in their reduced state. The cation loaded resin is then regenerated by eluting with an $H_2SO_3$/carbonyl solution. The eluate is then treated to recover $SO_2$ and carbonyl compounds, and from these recovered materials the $H_2SO_3$/carbonyl solution may be regenerated.

Residual rare earth salts which were not removed from the acid by ion exchange sorption can be further recovered through the medium of gel formation through hydrolization of the oxides in the dilute acid. Heating the solution to a temperature of about 88° C. to 95° C. will promote the formation of the gels which are readily filterable.

DETAILED DESCRIPTION

In contrast to the cations discussed previously which are readily removed by strong acid ion exchange resins, ferric ion, i.e., iron in the +3 oxidation state, presents other difficulties, some of which have been mentioned previously.

During an investigation of the state of oxidation of the iron contained in a contaminated phosphoric acid solution, it was established that the entire quantity of dissolved iron was in the +3 oxidation state, i.e., ferric ion. It has been determined that the dissolved iron could be readily reduced to the +2 oxidation state by contacting with a reducing agent, such as, for example, metallic iron.

It was found that at temperatures ranging from 0° C. to 70° C. it is possible to convert all of the iron in the +3 oxidation state to iron in the +2 oxidation state using iron powder as a reductant. The reductions may be performed in acid solutions ranging in concentration from 5% by weight to 55% by weight $P_2O_5$. The time required to afford complete reduction ranges from as short as thirty seconds to as high as 3 minutes, depending upon concentration of acid, temperature and quantity of $Fe^{+3}$ to be reduced. These solutions also contain calcium, aluminum, zinc, nickel, neodymium, cerium, lanthanum and strontium ions. Thus, the present invention exploits the fact that ferrous iron, that is to say, iron in the +2 oxidation state, can be readily adsorbed on strong acid ion exchange resins and readily eluted therefrom. Even in the case where iron is not a problem, if it is desired to recover cerium, for example, the reduction procedure outlined for iron is applicable, since $Ce^{+3}$ is more readily absorbed on resins than $Ce^{+4}$.

Although metallic iron, specifically powdered iron, has been referred to as a reducing agent for reducing iron from the +3 to the +2 oxidation state, it will be understood that this does not exclude the use of other reducing agents. For example, metallic aluminum, sulfur dioxide or hydrogen sulfide or other reducing agents compatible with the solution and sufficiently powerful to achieve the necessary degree of reduction would suffice equally as well.

It has been found that acidic solutions which have been treated with a reducing agent, contacted with a suitable strong acid ion exchange resin on the hydrogen cycle, and eluted from the resin bed contain up to about 30% by weight of the original iron. Table I illustrates this:

TABLE I

| Grams | 40% $P_2O_5$ solution | | Eluate | | Percent Fe not removed |
|---|---|---|---|---|---|
| | Percent Fe | Grams Fe | Percent Fe | Grams Fe | |
| 75.04 | 0.1562 | 0.1172 | 0.0058 | 0.0380 | 24.3 |
| 75.32 | 0.2875 | 0.2165 | 0.00195 | 0.0169 | 7.8 |
| 75.94 | 0.4292 | 0.3259 | 0.01153 | 0.0740 | 22.7 |
| 75.35 | 0.3080 | 0.2321 | 0.0058 | 0.0429 | 18.5 |
| 5.20 | 0.1940 | 0.1459 | 0.000194 | 0.00139 | 0.9 |

Standard techniques employed to surmount the problem, e.g., reduction of the solution at an elevated temperature and feeding it to the resin bed while still hot; preheating the resin bed to a temperature equal to that of the solution; operating at slower than usual "loading" rates, e.g., 1-2 bed volumes per hour; using a substantial excess of resin over the equivalence of contained cations; varying the strength of the acid medium, etc. failed to achieve the removal of iron and other cations to minimum levels. Hence, treating the acidic unreduced solution with a reducing agent to reduce ferric ion to ferrous ion before contacting the solution with an ion exchange resin has not resulted in all of the iron being adsorbed on the resin.

In examining the oxidation state of the iron eluted in the acid after it has passed over the resin bed it has been found that the iron is entirely in the +3 oxidation state. Since the iron originally fed to the resin bed is entirely iron in the +2 oxidation state, it is evident that the iron is re-oxidized in the resin bed in the very process of being adsorbed by the resin.

It has been found that when the resin is covered with distilled water and the Fe-reduced $P_2O_5$ solution is added and allowed to flow slowly through the resin bed, there is no sharply defined boundary between the aqueous phase and the acid phase—rather there is a broad interfacial region wherein the acid concentration varies from zero (purely water) to its maximum. Within this interfacial zone, the entrained free oxygen in the aqueous phase can readily oxidize +2 iron to the +3 state. It appears that acid is very dilute in this zone, and particularly on the aqueous side of the interfacial zone, and does not present a buffering effect against re-oxidation.

Accordingly, the invention contemplates avoidance of iron re-oxidation during contact with the ion exchange resin. This may be done by contacting the resin and the acid solution in a fashion which would not provide the conditions essential for re-oxidation of the $Fe^{++}$ to the $Fe^{+++}$ oxidation state.

The resin is removed from the column and gravity filtered of retained water, mixed in a suitable container with the Fe-reduced acid solution, stirred briefly, returned to the waiting column and eluted according to standard procedures. The acid thus treated is iron free.

The procedure may be varied with different percentages of resin being utilized, of the total resin in the column, to contact the Fe-reduced solution. With as little as 25% of the resin removed from the column, de-watered and mixed with the Fe-reduced solution, stirred momentarily and the slurry returned to the column and the acidic solution allowed to percolate through the remaining 75% of the resin, substantially total removal of the Fe is attained. It is believed that if the $Fe^{+2}$ can become established on resin sites immediately, the likelihood of its being oxidized by the water in the balance of the resin is materially reduced, provided that the solution that passes over the resin with the iron attached is strongly acidic. Table II provides examples of the effect of the system on Fe-reduced $P_2O_5$ solutions wherein re-oxidation is avoided.

TABLE II

| Grams | 40% $P_2O_5$ solution | | Eluate | | Percent Fe not removed |
|---|---|---|---|---|---|
| | Percent Fe | Grams Fe | Percent Fe | Grams Fe | |
| 33.08 | 0.3160 | 0.1035 | Nil | Nil | |
| 33.40 | 0.3115 | 0.1040 | Nil | Nil | |
| 33.50 | 0.3185 | 0.1067 | Nil | Nil | |
| 34.40 | 0.2990 | 0.1029 | Nil | Nil | |
| 34.10 | 0.3245 | 0.1106 | Nil | Nil | |

Various combinations of resin out-of-the-column and resin in-the-column may also be used. There seems to be little difference in the ability of the reduced Fe to attach to a resin site without subsequent oxidation so long as the amount of resin present in the beaker contains equivalents equal to those of the Fe in the solution. Better removal of other cations from the solution is obtained when one third or more of the total resin is left in the column.

A preferred procedure for carrying out the process of the present invention is to remove a portion of the resin from the column, remove as much entrained water therefrom as feasible, contact the liquor in which the iron has been reduced with the "dry" resin, and return the resultant slurry to the column where the balance of the resin is waiting. This procedure is readily adaptable to a fixed bed, semi-moving bed or continuous system such as that described by Higgins in U.S. Pat. No. 2,815,322.

The waiting resin need not be covered by water, but instead can be covered by the same acid as that from which the cations are being removed. In solutions containing silicic acid ($H_2SiO_3$) or, $SiO_2 \cdot xH_2O$, or metal oxides readily hydrolyzed into gels, for example, the oxides of Ce, Al, Fr, Cu, Pb etc., it may be necessary to use the acid as a covering medium for the resin-in-waiting or to make a special provision for settling and filtering the gel which will develop in the treated acid upon standing or heating.

The cation loaded resin is backwashed, preferably with de-oxygenated water to prevent gel formation in the resin if rare earths are suspected, and regenerated by eluting with an $H_2SO_3$/carbonyl solution of sufficient concentration to effectively remove substantially all of the adsorbed cations. Generally speaking, with cations whose affinity for resin is of the order of calcium, a one molar solution will suffice. However, where $Fe^{+2}$ and higher valence cations are present 2 molar solutions are preferable. The carbonyl additive employed is preferably an acetone, but it is not necessary that the carbonyl additive be restricted to acetone, since a number of other additives are equally or more effective in reducing the pH of the $SO_2$ solution, for example a carbonyl such as crotonaldehyde or furfuraldehyde may be used.

The effluent from the cation loaded ion exchange column is then passed sequentially through appropriate stripper-distillation sections to remove $SO_2$ and carbonyl compounds dissolved in the solution. Any sulfurous acid salts precipitated when the excess $H_2SO_3$ is removed and the pH of the system is raised may be filtered and reserved for further treatment, i.e., thermal decomposition to recover the oxide and liberated sulfur dioxide. The $SO_2$ gas obtained from the stripping-distilling and thermal decomposition operations can be recovered for production of additional quantities of sulfurous acid for further elution of loaded resin.

In the case of phosphoric acid that has been produced by the "wet process" and which will contain dissolved salts of the rare earths, it may be desirable to heat the decationized acid to 60° C. so that any rare earth oxides, notably cerium, being to hydrolyze and form a gel which can be removed subsequently by precipitation. If allowed to stand, the gel will form without heating, but more slowly.

A sulfur burner for roasting sulfite ores, or other $SO_2$ source, may be used to make up the in-process loss of $SO_2$. The extent of such loss will depend upon many factors, one of the most significant being the extent to which the sulfite salts are thermally decomposed to their respective oxides and $SO_2$.

Any strong acid resin may be used. Good results have been obtained by using an aromatic hydrocarbon polymer containing nuclear sulfonic acid groups, an example of which is the resin designated by the name "Dowex 50W–" a trademark of the Dow Chemical Co. This is of the general type described by D'Aleio in U.S. Pat. No. 2,366,007 and is fully described as to its characteristics, properties and general mode of use in the Journal of the American Chemical Society, November 1947, vol. 69 (No. 11) beginning at page 2830.

In fixed-bed systems, following the backwash step, a portion of the resin is removed from the column by increasing the backwash flow until the resin has been swept from the column in sufficient quantity to mix with the Fe-reduced acid solution. Following the mixing of the resin-acid solution the slurry is returned to the column by hydraulic means to contact the remaining resin.

In moving bed systems provision is made in the plumbing between the backwash tank and the resin bed so that a portion of the regenerated and washed resin is diverted to a special mixing vessel in which the resin and Fe-reduced solution are brought into contact. From there the resin acid slurry is hydraulically transferred to the resin bed for final cation removal.

When continuous systems are employed, such as the Higgins unit referred to above, a modification of the input section is required to accommodate the special contacting arrangement of this process.

In a co-pending application filed on even date herewith, description is made of a system adaptable to continuous ion exchange units wherein the column of resin, as it approaches the loading zone, is divided into two sections. One section serves to contact an ion-rich solution, a slurry, or an acid soluble solid, while the other section, by virtue of counter-current flow of resin and solution serves as a polishing section for removing final traces of unwanted cations. With minor modifications that system can be adapted to the instant application. The application also discloses systems for fixed or moving bed intsallations which will serve adequately for the instant purpose.

After the resin has been "loaded" with cations from contacting the Fe-reduced acid solution it must be regenerated before further use. Conventional regenerants can be employed, such as nitric, hydrochloric or sulfuric acid. These mineral acids react with the desorbed cations to form the respective salts and supply the $H^+$ ions required to restore the resins to their useful form. Following desorption of the cations the resin bed is washed free of excess acid-salt mixture and is ready for further cycling. However, the use of these mineral acids for regenerating the resin is not without limitations.

Only at the expenditure of considerable time and the utilization of substantial excess of eluting acid over the stoichiometric quantity indicated by the respective salts to be formed and the quantities thereof, can the resin be completely freed of all adsorbed cations. In effect, a portion of the active resin sites will ordinarily be continuously occupied by cations other than hydrogen. Thus, either an excess of resin must be used, i.e., greater resin equivalency than that of the cations to be adsorbed, resulting in oversized equipment and concomitantly larger investment, or economically excessive quantities of regenerating acid must be employed. The salts produced by conventional regeneration methods are typically of low value, or no value whatever, and (with the notable exception of calcium sulfate) are frequently soluble in relatively dilute acids, from which the salts can be recovered only at the expenditure of substantial amounts of thermal energy to evaporate the effluent.

Another important limitation concerning the use of traditional regenerant acids relates to the disposal problems of large volumes of effluent. Since the effluent is acid, it must be treated to neutralize or at least reduce the acidity before the material can be "sewered." If "liming" or other sweetening techniques are pursued, large settling basins must be used to dispose of the sludges, or special filtering equipment must be installed.

It is not feasible to recover with any degree of economy or efficiency the excess acid used in the regeneration step unless the acid is more concentrated at the outset than is normally recommended for use in the resin and is used in a relatively great excess so that the effluent stream is acid-rich. The physical shock to the resin from the excessive dehydration by the strong acid, followed by rehydration from the backwash step, may inflict sufficient structural damage upon the resin to negate any advantages gained by the ability to recycle the effluent acid. In any case, the only effective means for recovering excess acid is through distillation techniques with the concomitant consumption of thermal energy.

Even under the most careful elution systems there is a tendency for cations to build up on the resin sites, necessitating special treatment to loosen these cations. A change in the eluting acid from, for example, sulfuric to strong nitric for one or two cycles, or the addition of some special agent to assist in loosening the adhering cations is frequently suggested.

One of the most troublesome cations in this respect is iron. The mode of operation seems to be that the ferrous ($Fe^{+2}$) iron is oxidized to the +3 oxidation state after it is adsorbed on the resin and before the eluting acid can effect the removal of the cation. The process is believed to be identical to that described earlier where the +2 iron was oxidized to +3 iron in the interfacial zone between the water phase and the acid phase. Here the +2 iron is already adsorbed on the resin, but as the acid phase is washed from the resin prior to regenerating the resin, a part of the iron is oxidized to the +3 state while on the resin. If not removed in time, the +3 iron will, it is believed, be further converted to $Fe_2O_3$ within the resin and is difficult to remove.

The tendency for multivalent cations to hydrolyze to relatively insoluble salts holds true for ions other than iron, for example, calcium.

The disadvantages attendant on the practice of conventional resin regeneration procedures can be significantly offset by the utilization of sulfurous acid as the regenerant acid. The use of sulfurous acid in the regeneration of ion exchange resins is cited in the literature and has been the subject of patent protection in selected uses. Effer, Marshall and Hopper in U.S. Pat. No. 3,095,265 describe a system for recovery of sodium ion and ammonium ion from spent sulphite liquor, wherein sulfurous acid is used to strip the monovalent cations that are adsorbed in the resin column. According to this procedure sulfurous acid is found to be ineffective against multivalent cations adsorbed on resins.

However, Wilson, in a report to the 1964 Sulfite Pulp Meeting of the Canadian Pulp and Paper Association, revealed the use of sulfurous acid in a single step regeneration system for removal of monovalent and multivalent cations. Monovalent cations predominated, accounting for approximately 85–90% of the total ion load. Wilson's success is attributable to the fact that the addition of organic compounds to acidic solutions tends to lower the pH, or, increase the acidity of the solution. In his examples he cited a number of organic additives and their effect upon the pH of 1 molar $H_2SO_3$ solutions. In his conclusions he supported the use of acetone as additive, although other organics achieved lower pH levels in the sulfurous acid.

The following table reproduces his findings:

TABLE III

| Carbonyl compound additive | Molarity | Solution pH | Reduction in pH | B.P. of additive, ° C. |
|---|---|---|---|---|
| None | 1.00 | 0.78 | | |
| Acetone | 0.84 | 0.16 | 0.62 | 56.5 |
| Acetaldehyde | 1.00 | 0.31 | 0.47 | 21.0 |
| Crotonaldehyde | 1.00 | 0.00 | 0.78 | 105.0 |
| Cyclohexanone | 1.00 | 0.08 | 0.70 | 155.0 |
| Furfuraldehyde | 1.00 | 0.15 | 0.73 | 161.7 |
| Iso-butyraldehyde | 1.00 | 0.18 | 0.60 | 61.5 |
| Methyl ethyl ketone | 1.00 | 0.26 | 0.52 | 79.6 |

In these earlier studies, it was reported that multivalent cations amounted to not more than about 15% of the total cation load, with ammonium and sodium cations making up the balance.

In contrast thereto the present invention contemplates that the greater portion of the cations to be removed from acidic solutions and subsequently eluted from the resin will be multivalent. For example, in "cleaning-up" phosphoric acid from a normal "Wet Process" method, the ions to be removed would be calcium, iron (ferric), aluminum, chromium, nickel, vanadium and rare earths. All of these are in divalent or trivalent or higher oxidation states.

The prior art also indicates that approximately 10% of the resin sites are usually permanently occupied with cations. With the present invention, the pre-reduction of the ferric iron to the ferrous (+2) state accounts for the complete removal of all cations from the resin sites. It is believed that the tendency for ions to remain attached to the resin sites in prior art investigations probably represents accumulated $Fe^{+2/+3}$ ions that were only gradually removed under the imposed operating conditions.

The use of sulfurous acid on a continuous basis to elute cations from the resin which has been loaded by multivalent cations adsorbed from acidic solutions is accompanied by no tendency for permanent accumulation of cations.

After 22 complete loading-regenerating cycles in which various cations were removed from 40% $P_2O_5$ solution and the resin regenerated with 2 molar $H_2SO_3$ solution containing 2 moles of acetone to reduce the pH, a sample of the resin was analyzed to determine the total capacity. The procedure followed is that described in the reference manual "Duolite Ion Exchange Manual," ch. 10, p. 43, published by the Chemical Process Company, Western Division, Diamond Alkali Company, 1960.

The total capacity of the fresh resin was 1.965 milliequivalents per milliliter of damp resin and the used resin, 2.00 milli-equivalents per milliliter. The values are averages of three separate determinations. The resin utilized was Dowex 50W–X8.

The effluents from the conditioning steps undertaken prior to the total capacity determinations were reserved and tested for Fe and Ca ions. No Fe ions were detected and a trace of ion susceptible to oxalate precipitation, calcium or a rare earth oxide, was detected in the first sodium chloride rinse. The quantity of precipitate was too minute for measurement.

The effluent from regenerating a cation-loaded column of ion exchange resins with a solution of sulfurous acid/acetone mixture, consists of a solution containing excess sulfurous acid, acetone, and the dissolved salts of the cations with which the resin has been loaded. The exact composition of the dissolved sulfurous acid salts is not known but is believed to be initially bi-sulfites which upon heating will convert to the normal sulfite salt. Calcium, for example, would be expected to elute as a bi-sulfite salt, $Ca(HSO_3)_2$, which is soluble in either water or acids. However, upon heating, the compound would decompose initially to the sulfite state, $CaSO_3$. Further elevation of temperature will result in the decomposition of this salt ino the two compounds, CaO and $SO_2$. Similar decompositions patterns prevail for the other sulfurous acid salts that may be formed in the elution process. The "Handbook of Chemistry and Physics" 43d edition (1961) lists sulfite salts for a large number of elements. The existence of double sulfite salts for many rare earths are noted in "Analytical Chemistry of the Rare Earths," Vickery, R. C., Pergamon Press, 1964. Virtually all of the compounds listed in the Handbook can be decomposed thermally into their respective oxides with the liberation of $SO_2$.

The thermal decomposition of calcium sulfite indicates the existence of a critical temperature point at which an apparent auto reduction-oxidation phenomena occurs, with the reduction of $Ca^{++}$ to CaS and the oxidation of the $SO_2$ to $SO_3$. This action is believed to be due to the presence of catalytic materials in or on the surface of the chamber in which the decomposition studies were made. The reaction can be suppressed by performing the decomposition in an inert atmosphere or in a zone in which there are no catalytically active materials. Such an environment, i.e., non-catalytic, can be created by coating the surfaces of the chamber wherein the thermal decomposition is to be undertaken by a glaze of a phosphorous-containing compound such as described by Halversen et al.

in U.S. Pat. No. 2,741,565. This patent discloses a method for depositing on metallic or ceramic surfaces a protective glaze which is chemically resistant, highly impervious and non-catalytic. Moreover, the formation of an impervious glaze on the surface of the coated material effectively prevents catalytic action of materials contained on the surface of the chamber walls themselves.

The sulfite salts which would ordinarily be eluted are soluble in sulfurous acid solutions and other acids but are relatively insoluble, or not at all soluble in water. Those sulfite salts showing solubility in water are, with the exception of sodium and thallium salts, inversely related to temperature. This can be observed from Table IV:

TABLE IV

| Compound | Solubility in gms./100 ml. of | | | Thermal stability |
|---|---|---|---|---|
| | Water | | Other | |
| | Cold | Hot | | |
| $BaSO_3$ | $0.02^{20}$ | $0.002^{80}$ | HCl | Decomposes. |
| $CaSO_3 \cdot 2H_2O$ | 0.0043 | 0.0011 | S. $H_2SO_3$ | Decomposes 650° C. |
| $Ca(HSO_3)_2$ | Sol | | Sol. acid | |
| $CdSO_3$ | Sol. | | S. a | Decomposes. |
| $Cr_2(SO_3)_2$ | | | | Do. |
| $CoSO_3 \cdot 5H_2O$ | i | | S. $H_2SO_3$ | |
| $Cu_2SO_3 \cdot H_2O$ | Sl.S. | | S. HCl | Do. |
| $2In_2O_3 \cdot 3SO_2 \cdot 8H_2O$ | i | | S. acid | $8H_2O$ at 260°. |
| $FeSO_3 \cdot 3H_2O$ | V.Sl.S. | | Sol. $SO_2$ sol'n | Decomposes 250° C. |
| $PbSO_3$ | i | i | S. $HNO_3$ | |
| $Li_2SO_3 \cdot H_2O$ | Sol. | Sol. | Insol. alcohol | Decomposes slightly. |
| $MgSO_3 \cdot 6H_2O$ | 1.25 | 0.83 | | Decomposes. |
| $NiSO_3 \cdot 6H_2O$ | i | | S. HCl, $H_2SO_4$ | |
| $OsSO_3$ | i | | Dil. HCl, Alk | Do. |
| $K_2SO_3 \cdot 2H_2O$ | 100 | <100 | | Do. |
| $KHSO_2$ | Sol. | Sol. | | Decomposes 190°. |
| $RH_2(SO_3)_3 \cdot 6H_2O$ | Sol. | | Sol. acids | Decomposes. |
| $Ag_2SO_3$ | V.Sl.S. | | Sol. acid (insol. $HNO_3$) | Decomposes 100°. |
| $Na_2SO_3$ | 12.54 | 28.3 | Sl. sol. alcohol | Decomposes. |
| $Na_2SO_3 \cdot 7H_2O$ | 32.8 | 196 | do | Do. |
| $NaHSO_3$ | V.S. | V.S. | do | Do. |
| $SrSO_3$ | 0.0033 | | V.S. $H_2SO_3$, sol. acid | Do. |
| $Tl_2SO_3$ | 3.34 | V.S. | Insol. alcohol | |
| $UO_2SO_3 \cdot 4H_2O$ | i | | Sol. $H_2SO_3$ | |
| $ZnSO_3 \cdot 2H_2O$ | 0.16 | V.S. | Sol. $H_2SO_3$ | Do. |

The relative insolubility of these salts in water affords a simple procedure for their extraction from the ion exchange eluate. The eluate is first passed through a stripper section in which the $SO_2$ gas and the acetone are selectively removed and recovered for recycle. As the two volatile constituents are removed from the solution, the pH will be increased, thereby facilitating the precipitation of the salts. Through selective precipitation some separation of the salts could be achieved. The extent to which the $SO_2$ would be stripped from the effluent would be a function of the solubilities of the contained salts.

The stripped liquor, after filtering the precipitated solids, can be recycled to form new $H_2SO_3/(CH_3)_2CO$ solution for further resin regeneration. The sulfite salts that have been precipitated and filtered can be sent to a furnace for thermal decomposition and further $SO_2$ recovery and recycle.

In some applications the use of the present invention will make it possible to recover metal values from ion exchange eluate which could not be economically recovered under other circumstances. For example, "wet process" phosphoric acid ordinarily contains the dissolved salts of rare earths and uranium found in the apatite concentrate from which the acid is produced. These salts, even in the low concentrations in which they normally are found, can be recovered as mixed oxides by this system.

A number of these salts are shown in Table V:

TABLE V.—SOLUBILITY OF CERTAIN RARE EARTH SULFITES

| Compound | Solubility in $H_2O$ | Solubility in $H_2SO_3$ |
|---|---|---|
| $Ce_2(SO_3)_3 \cdot 3H_2O$ | Soluble, gradually decomposing. | Soluble. |
| $Di_2(SO_3)_3 \cdot 3H_2O$ | Insoluble in $H_2O$ | Soluble; however, upon heating it will precipitate and can then be dissolved in cold water. |
| $Sc_2(SO_3)_3 \cdot H_2O$ | Insol. cold, sol. hot | Sol., also soluble in excess sodium sulfite. |
| $Yb_2(SO_3)_3 \cdot 3H_2O$ | Insoluble | Soluble. |
| $Yt_2(SO_3) \cdot 9H_2O$ | Slightly sol | Do. |

A portion of the salts not adsorbed by the resin, can be recovered from the phosphoric acid after removing the ferrous and other readily adsorbable ions by simply heating the acid to 60° C. at which temperature the rare earths present as hydrous oxides will begin to form hydrated gels and can be removed by filtration. If the acid is to be concentrated, the elevated temperatures prevailing in the concentration stages will hasten the gell formation. The gels will age slowly even on standing without any temperature elevation, and can be filtered in the normal fashion upon precipitation.

EXAMPLES

The following examples of process runs are illustrative of the present invention but are not to be construed in a limiting sense.

Example 1

99.9 grams of 40% by weight $P_2O_5$ solution analyzing 0.1267% total Fe ($Fe^{+2}$=0.00%) was heated to 70° C., following which 0.1 gram of powdered Fe was added as reducing agent. After one minute the solution was analyzed for total Fe and $Fe^{+2}$. Each was determined to be 0.2312% of the solution. Other trials were as follows:

| | Strength of acid | | | |
|---|---|---|---|---|
| | 10% | 20% | 30% | 40% |
| Grams of $P_2O_5$ solution | 99.8 | 99.8 | 99.9 | 99.9 |
| Percent Fe | 0.039 | | 0.1005 | 1.0267 |
| Fe powder used, gm | 0.20 | 0.20 | 0.10 | 0.10 |
| Time, minutes | 2.0 | 5.0 | 1.0 | 0.5 |
| Temperature, ° C | 30 | 70 | 50 | 30 |
| $Fe^{+2}$, percent | 0.077 | 0.1043 | 0.174 | 0.1982 |
| Total Fe, percent | 0.077 | 0.1043 | 0.174 | 0.1978 |

Example 2

35.82 grams of 54% acid solution analyzing 0.19% total Fe was heated to 70° C. after which 0.4 gram of powdered iron was added to effect reduction of the $Fe^{+3}$ to the +2 oxidation state. While hot, the solution was added to 50 ml. of Dowex 50W-X8 strong acid ion exchange resin in the hydrogen form. The resin was contained in a 250 ml. glass beaker and initially had been gravity filtered of entrained water. The resin-acid slurry was stirred briskly for two minutes and then added to an additional 50 ml. of identical resin which was contained in a 150 ml. burette and barely covered with distilled water. The acid was allowed to flow over the remaining resin and was washed from the resin using distilled water which had been boiled preliminarily to remove as much entrained $O_2$ as possible. The acid-water feed rate was approximately three bed volumes per hour. The eluate acid was tested for Fe and found to be quantitatively free thereof. Total Fe removed was 0.1042 grams, including Fe added as reducing agent.

Example 3

100 milliliters of Dowex 50W–X8 strong acid ion exchange resin which had been cycled through 22 complete loading and unloading (regenerating) steps, using 2 molar $H_2SO_3/(CH_3)_2CO$ solution as regenerant, was conditioned and tested for total capacity. The purpose of the determination was to establish to what, if any, extent the sulfurous acid-acetone mixture was failing to completely elute the ion exchange resins. The necessity for this added step was found in the nature of the ions contained in the original solution and the unreliability of the quantitative measures utilized in analyzing the eluate. The solution charged to the column contained substantial amounts of aluminum, cerium and other rare earths as well as iron and calcium. The rare earths are particularly troublesome since they form complexes with or are precipitated by, the reagents ordinarily employed for the quantitative determination of Fe and Ca ions. The procedure followed was that described in the "Duolite Ion Exchange Manual" (1961). The resin was first conditioned by alternately loading the resin with 5% solution of NaCl and then regenerating the resin with 4 N HCl. This procedure was repeated twice. These washes were reserved and quantitatively measured for Fe and Ca ions. The results were as follows:

| Wash | Grams | Percent Fe | Percent Ca [1] |
| --- | --- | --- | --- |
| 1st. 5% NaCl | 518.92 | Nil | Trace. |
| 1st. 4 N HCl | 536.07 | Nil | Nil. |
| 2nd. 5% NaCl | 510.60 | Nil | Nil. |
| 2nd. 4 N HCl | 546.71 | Nil | Nil. |

[1] Determined by oxalate precipitation and contains rare earth salts.

Following the above routine, the resin was then converted to the sodium form and the entire eluate, including wash water, was titrated against 0.1 N NaOH to determine the H+ content of the solution. The capacity of the resin was calculated according to the formula $$\frac{\text{ml. NaOH} \times N_{NaOH}}{\text{ml. damp resin}} = \text{milli-equivalents per ml. of resin}$$

Three measurements were made: the average being 2.00 m.-eq. per ml. of damp resin. For comparison, the same determination was made on fresh, unused resin. Total capacity of the new resin was 1.965 m.-eq. per ml. of damp resin.

The resin had been used to remove 3.9396 grams of Fe ions and 16.2348 grams of Ca ions from solution.

Example 4

354.41 grams of eluate from $H_2SO_3/(CH_3)_2CO$ regeneration of "loaded" Dowex 50W–X8 resin were evaporated to dryness. The residue weighed 0.98 gram. Spectrographic analysis revealed the presence of iron, calcium, sulfur, zinc, nickel, neodymium, cerium, lanthanum and aluminum. No anion from the original solution was revealed by the analysis.

Example 5

620.61 grams of regenerated acid, plus wash water used to rinse the acid from the ion exchange resin, with the following analysis:
Fe-nil
Oxalate precipitates 0.0004495% by weight were heated gradually to the boiling point. The solution was originally clear. At 60° C. a noticeable "milkiness" manifested itself and, becoming more pronounced at higher temperatures, eventually formed a firm gel-like floc at 96° C. While still hot, the solution was filtered through a Blauband No. 589 paper filter. The resulting solution was clear. The solution was reheated to 100° C. and then vigorously boiled until the volume was diminished by one-half. No further precipitate formation was observed. The cooled solution was tested for oxalate precipitants, but none were observed.

Example 6

40.0 grams of solution were treated to reduce $Fe^{+3}$ to the +2 oxidation state as in Example 2. However, following the contact with the resin, the resulting resin-acid slurry was added to a column of resin which was covered by 35% (approximately) $H_3PO_4$ solution. The column was eluated and washed as before, and the regenerated acid heated to 100° C. as in Example 5. The gel development seen in the previous example was not observed in this instance. Apparently, the presence of the acid in the resin acts to peptize the hydrous oxides in the cleaned acid and prevents their forming gels.

Example 7

In the following series calcium was removed from a 5% by weight acid solution with the aid of Dowex 50W–X8 strong acid ion exchange resin on the hydrogen cycle in accordance with the procedures described in Examples 2 and 5. After the acid solution was passed over the resin it was washed with deoxygenated distilled water and the entire eluate was reserved for analysis. The resin was then backwashed to remove hydrolysed gels that might be present and the resin was then regenerated with a 1 molar sulfurous acid—1 molar acetone solution. The resin was washed from distilled water to pH 6 and the entire eluate was reserved for analysis for calcium ions. The results are as follows:

| Sample | Feed | | Removed from resin | |
| --- | --- | --- | --- | --- |
| | Grams | Grams calcium | Grams | Grams calcium |
| 1 | 35.25 | 0.5573 | 694.67 | 0.1539 |
| 2 | 35.18 | 1.0320 | 702.96 | 1.8502 |
| 3 | 20.10 | 0.1064 | 546.06 | 0.4042 |
| 4 | 20.12 | 0.0499 | 570.82 | 0.0619 |
| 5 | 40.00 | 0.0930 | 596.97 | 0.0804 |
| 6 | 40.42 | 0.0887 | 741.81 | 0.0662 |

It will be noted that the amount of calcium eluted from the resin in some runs exceeds that which was deposited thereon. The discrepancy is accounted for by the substantial differences in acid concentration plus the distorting effect that $SO_2$ had on the calcium determinations. Rare earths in the solution may have had a disturbing effect upon the analytical results since they will, under certain circumstances, complex with the reagents utilized to titrate the $Ca^{++}$ ion. Both pH and concentration of acid play a role in determining the effect of this disturbing action by rare earths.

Example 8

60% by weight acidic solution containing iron, calcium, aluminum, cerium, lanthanum and neodymium was first heated to 75° C. and the ferric iron reduced to the +2 oxidation state by aid of iron powder, as in Examples 2 and 5. The resin, Dowex 50W–X8 strong acid cation exchange resin on the hydrogen cycle, was also heated to 75° C. A quantity of de-oxygenated distilled water for rinsing the residual acid from the resin was likewise heated to 75° C.

41.70 grams of the Fe-reduced solution were first mixed with 40 milliliters of the preheated resin, stirred gently for one minute and then quickly added to 60 milliliters of the heated resin which was in a 150 milliliter laboratory burette. The resin in the burette was barely covered by preheated, deoxygenated water. The acid-cation solution was passed over the resin at a rate of 6 bed volumes per hour and then washed with the treated distilled water to pH 6.0. The de-cationized solution and wash water was reserved for analysis for iron and calcium.

The resin was backwashed and then regenerated, after first cooling, with a solution of 2 molar $H_2SO_3$ in 2 molar acetone solution. The eluting acid was cooled to approximately 5° C. to prevent gassing in the resin bed during elution. The sulfurous acid/acetone mixture was rinsed from the resin bed to pH 6.0 with distilled water and the entire quantity was reserved and analyzed for iron and calcium ions. The results were as follows:

|  | Grams | Grams Fe | Grams Ca |
| --- | --- | --- | --- |
| Acid feed | 41.70 | 0.1939 | 0.0737 |
| Recleaned acid | 376.42 | 0.0029 | nil |
| Regenerant+wash water | 580.45 | 0.1564 | 0.0950 |

The cleaned acid was tested qualitatively for iron using potassium ferricyanide, potassium ferrocyanide and ammonium thiocyanate. In each case the results were negative, supporting the belief that the reported iron was in fact one of the rare earths. (Rare earths will complex with diphenylamine sulfonic, which is used as an indicator for titration if iron.)

The cleaned acid was then heated to boiling, and, following a brief period to permit the hydrolysis of any gel present, was filtered and analyzed again for iron and calcium ions, the result being as follows:

Cleaned, boiled and filtered acid:
  Grams _____ 203.48
  Grams Fe _____ 0.00125
  Grams Ca _____ Nil The filtered acid was again reheated and boiled, but no further precipitate appeared.

After cooling, the pH of the acid was adjusted to approximately 4.0 and treated with oxalic acid and allowed to stand overnight. A very slight precipitate was visible in the solution the following morning. The solution was filtered and again the filtrate was analyzed for iron and calcium. The results were negative. It was thus concluded that the cationic material in the recleaned acid that was reported by qualitative methods as being iron, was, in fact, one of the rare earths contained in the original acid solution.

Example 9

130 milliliters of fresh Dowex 50W–X8, on the sodium cycle, was conditioned and regenerated for use according to the manufacturers instructions. A sample was reserved of 10 ml. The remaining 120 ml. of resin was contacted with a 40 gram sample of "wet process" phosphoric acid which had been previously treated to reduce the Fe+3 to Fe+2 and contacted with the resin in the manner described in the present application. After the resin had been washed free of residual acid, and backwashed, a 10 ml. sample was reserved (Sample 2). The remaining resin was regenerated with 2 molar $$H_2SO_3/(CH_3)_2CO$$

solution and washed free of residual acid. A third sample of 10 ml. of resin was reserved (Sample 3). The three samples of resin were then analyzed spectrographically; the results were as follows:

| Percent* | Fresh resin | Loaded | Regenerated |
| --- | --- | --- | --- |
| 5 |  | Fe |  |
| 1.0 |  |  | Fe |
| 1.0 |  | Sr |  |
| 0.1–1.0 | Br, Fe | Ni, Mn, Ce, Ca | Y, Zn, Sr, Mn |
| Trace | Zn, Sm, Ni, Ce | Sn, Cd, Zr, Y, Th, Br, Pb, Zn, Gd, Nd, Ba | Br, Ni, Gd, Nd, Ce, Ca |

*NOTE.—The percentages shown are the relative percentage of each element of the total elements present.

In addition, M. Ruprych, Chem. Tech. (Berlin) 9, 353, 1957, W. I. Mazgaj Chem. Tech. (Berlin) 9, 350, 1957 and M. Man, Rev. Chim. (Bucharest) 8, 571, 1957, teach that rare earth phosphates may be precipitated from phosphoric acid produced by the reaction of nitric acid on apatite by the simple expedient of raising the pH of the solution to approximately 2.5 by the addition of ammonia, ammonia gas or ammonium hydroxide. Szauefer, J. and Borkowski, B. (Przmysl Chem. 44, 323–24, 1965, Pozaán) find that the same objective can be accomplished with the use of sodium hydrogen carbonate, $NaHCO_3$, with the first precipitate appearing at a pH of about 1.0. The writer has found that similar precipitations can be obtained using NaOH, with the first precipitate appearing at a pH of approximately 0.8.

These phenomena suggest an alternative procedure for removing cations from an acidic solution, where the precipitation can occur at a relative low pH, then further removal of the remaining cations by ion exchange techniques which at the same time remove the basic cations and restore the hydrogen ion so that the acid has been recovered. As an illustration, any of the above mentioned basic materials could be used to partially neutralize a solution of "wet process" phosphoric acid so as to preferentially precipitate the rare earth salts, then reduce the iron in the filtrate according to the system described in the present application, contact with a strong acid ion exchange resin on the hydrogen cycle to remove the reduced iron and at the same time remove the basic ions added in the neutralization. The hydrogen ion thus restored would result in the phosphoric acid being regenerated.

These illustrations and examples are not deemed to be limiting but are presented solely to describe the flexibility of the concept. Workers skilled in the art of ion exchange techniques will have no difficulty devising other mechanical systems to achieve the objective of contacting the ion exchange resins and the Fe-reduced solutions so as to fall within the province of the inventive concept for removing cations from acidic solutions.

What is claimed is:

1. A process for regenerating an acidic solution by removal of cationic iron contaminants which comprises reducing said iron to an ionic oxidation state lower than its highest oxidation state, contacting the acidic solution containing said reduced iron with a cationic ion exchange resin on the hydrogen cycle to remove said ionic iron contaminants and form a resin loaded with said contaminants and a depleted acidic solution, the contacting taking place while at least a part of said iron cations are maintained in said lower oxidation state and under conditions such that said lower oxidation state is maintained.

2. A process according to claim 1 wherein the acidic solution is treated with a reducing agent before contacting with the strong acid ion exchange resin.

3. A process according to claim 2 wherein the reducing agent is selected from group consisting of metallic iron, sulfur dioxide, metallic aluminum, or hydrogen sulfide.

4. A process according to claim 3 wherein the reducing agent is metallic iron.

5. A process according to claim 1 wherein said lower oxidation state is maintained by removing essentially all oxygen from the resin environment prior to and during the resin contacting step.

6. A process according to claim 1 wherein the resin is in an essentially non-oxidizing medium prior to and during the resin contacting step.

7. A process according to claim 1 wherein the acidic solution is contacted with said resin that is substantially dry to form a mass and the mass is thereafter contacted with additional resin.

8. A process according to claim 1 wherein the resin is backwashed after contacting the acidic solution.

9. A process according to claim 1 wherein the resin is regenerated by eluting with a regenerant consisting of sulfurous acid and a carbonyl compound.

10. A process according to claim 9 wherein the carbonyl compound is selected from the group consisting of acetone, acetaldehyde, crotonaldehyde, cyclohexanone, furfuraldehyde, isobutyraldehyde or methylethyl ketone.

11. A process according to claim 10 wherein the carbonyl compound is acetone.

12. A process according to claim 9 wherein the eluate from the resin is treated to recover $SO_2$ and carbonyl compounds dissolved in the eluate.

13. A process according to claim 12 wherein the recovery of $SO_2$ causes salts to precipitate and wherein the precipitated salts are recovered.

14. A process according to claim 13 wherein the precipitated salts are sulfites.

15. A process according to claim 14 wherein further heating of the precipitated salts form oxides.

16. A process according to claim 13 wherein the removal of $SO_2$ is accomplished by heating.

17. A process according to claim 13 wherein the acidic solution after contacting the resin is treated to recover rare earth compounds.

18. A process according to claim 17 wherein the rare earth compounds are caused to form a gel.

19. A process according to claim 13 wherein the acidic solution is contacted with a first portion of the resin that is substantially dry, thereafter contacted with another portion of the resin, and heated to from about 88° C. to about 95° C., thereby forming a precipitate.

20. A process as claimed in claim 1 in which said iron is reduced by reacting it with a reducing agent selected from the group consisting of metallic iron, sulfur dioxide, metallic aluminum, and hydrogen sulfide and in which the iron in said lower oxidation state is contacted with a portion of a cationic exchange resin that is substantially dry to form a mass and the mass is thereafter contacted with an additional portion of said resin.

21. A process as claimed in claim 1, wherein said acidic solution is neutralized by contacting with a basic material.

22. A process as claimed in cliam 21, wherein iron in the filtrate is reduced.

23. A process as claimed in claim 22, wherein contact is then made with an ion exchange resin on the hydrogen cycle to remove reduced ions and basic ions.

24. A process as claimed in claim 23, wherein precipitation occurs at a below 7 pH.

25. A process as claimed in claim 21, wherein said neutralization occurs by contacting the acidic solution with a resin on the sodium cycle.

26. A process for regenerating an acidic solution by removal of multivalent cationic contaminants which comprises reducing said multivalent cationic contaminants to an ionic oxidation state lower than its highest oxidation state, contacting the acidic solution containing said reduced multivalent contaminants with a cationic ion exchange resin on the hydrogen cycle to remove said ionic contaminants and form a resin loaded with said contaminants and a depleted acidic solution, the contacting taking place while at least a part of said cations are maintained in said lower oxidation state under conditions such that said lower oxidation state is maintained, said loaded ion exchange resin being regenerated by eluting with a regenerant consisting of sulfurous acid and a carbonyl compound.

27. A process according to claim 26 wherein the acidic solution is treated with a reducing agent before contacting with the ion exchange resin.

28. A process according to claim 27 wherein the reducing agent is selected from group consisting of metallic iron, sulfur dioxide, metallic aluminum, and hydrogen sulfide.

29. A process according to claim 28 wherein the reducing agent is metallic iron.

30. A process according to claim 26 wherein said lower oxidation state is maintained by removing essentially all oxygen from the resin environment prior to and during the resin contacting step.

31. A process according to claim 26 wherein the carbonyl compound is selected from the group consisting of acetone, acetaldehyde, crotonaldehyde, cyclohexanone, furfuraldehyde, isobutyraldehyde or methylethyl ketone.

32. A process according to claim 31 wherein the carbonyl compound is acetone.

33. A process according to claim 26 wherein the eluate from the resin is treated to recover $SO_2$ and carbonyl compounds dissolved in the eluate.

34. A process according to claim 33 wherein the recovery of $SO_2$ causes salts to precipitate, and wherein the precipitated salts are recovered.

35. A process according to claim 34 wherein the precipitated salts are sulfites.

36. A process according to claim 34 wherein the removal of $SO_2$ is accomplished by heating.

37. A process according to claim 34 wherein the depleted acidic solution after contacting the resin is treated to recover rare earth compounds.

38. A process according to claim 37 wherein the rare earth compounds are caused to form a gel.

39. A process according to claim 37 wherein the acidic solution is contacted with a first portion of the resin that is substantially dry, thereafter contacted with another portion of the resin, and heated to from about 88° C. to about 95° C., thereby forming a precipitate.

40. A process according to claim 26 wherein the resin is in an essentially non-oxidizing medium prior to and during the resin contacting step.

41. A process according to claim 26 wherein the acidic solution is contacted with said resin that is substantially dry to form a mass and the mass is thereafter contacted with additional resin.

42. A process according to claim 26 wherein the resin is backwashed after contacting the acidic solution.

43. A process as claimed in claim 26 in which said multivalent is reduced by reacting it with a reducing agent selected from the group consisting of metallic iron, sulfur dioxide, metallic aluminum and hydrogen sulfide and in which said multivalent cation in said lower oxidation state is contacted with a portion of a cationic exchange resin that is substantially dry to form a mass and the mass is thereafter contacted with an additional portion of said resin.

44. A process as claimed in claim 43 in which the multivalent cationic contaminant is selected from the group consisting of iron, nickel and cerium.

References Cited

UNITED STATES PATENTS

| | | | |
|---|---|---|---|
| 2,849,279 | 8/1958 | Bailes et al. | 23—338 |
| 2,869,979 | 1/1959 | Grinstead | 23—338 XR |
| 3,374,068 | 3/1968 | Erlandson et al. | 23—338 XR |

LELAND A. SEBASTIAN, Primary Examiner

U.S. Cl. X.R.

23—19, 129, 183, 200; 210—32, 38; 252—317